Oct. 31, 1967  H. A. BALINSKI  3,349,535
STRUCTURAL MEMBER WITH AN X CONFIGURATION WEB
Filed April 15, 1964  2 Sheets-Sheet 2
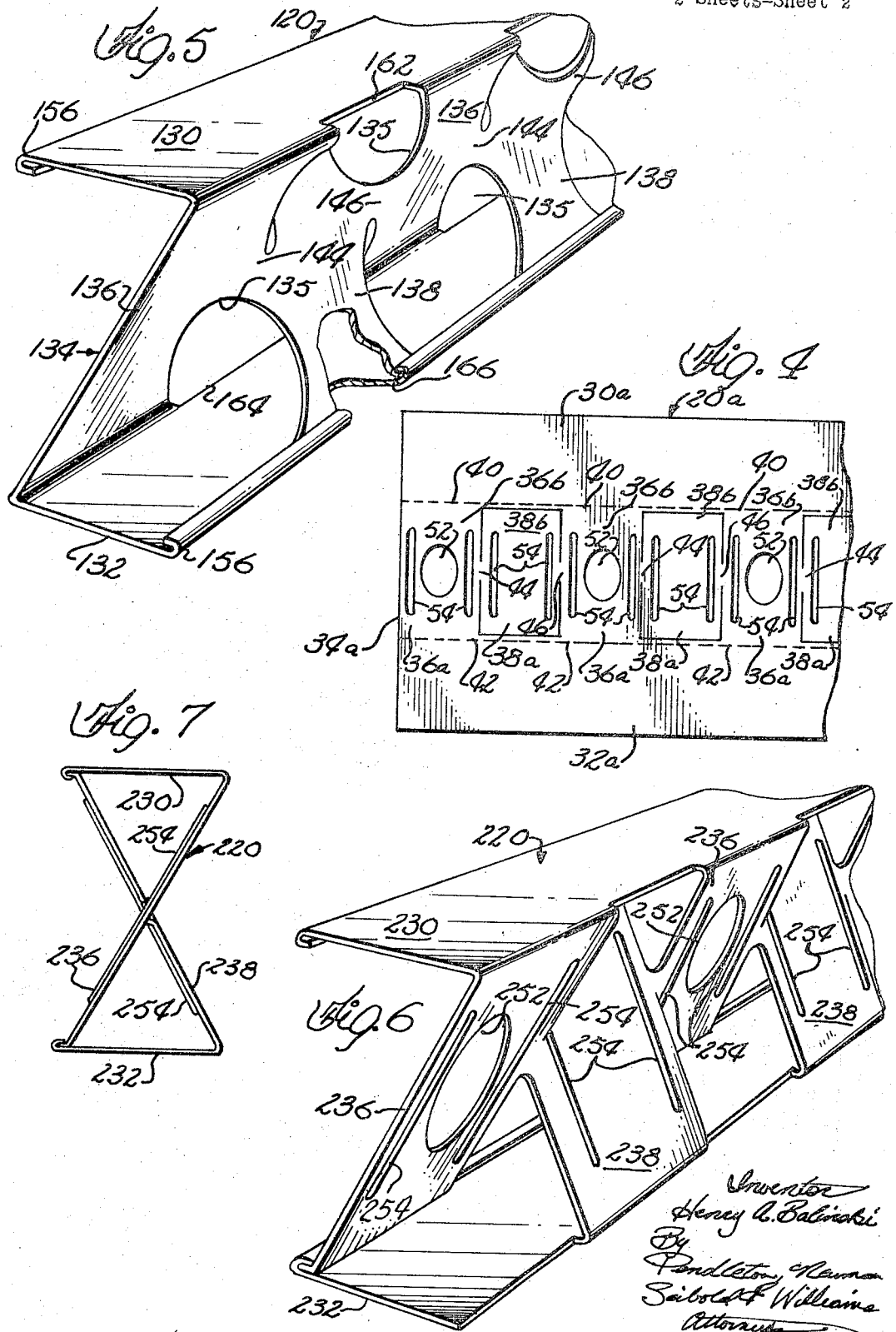

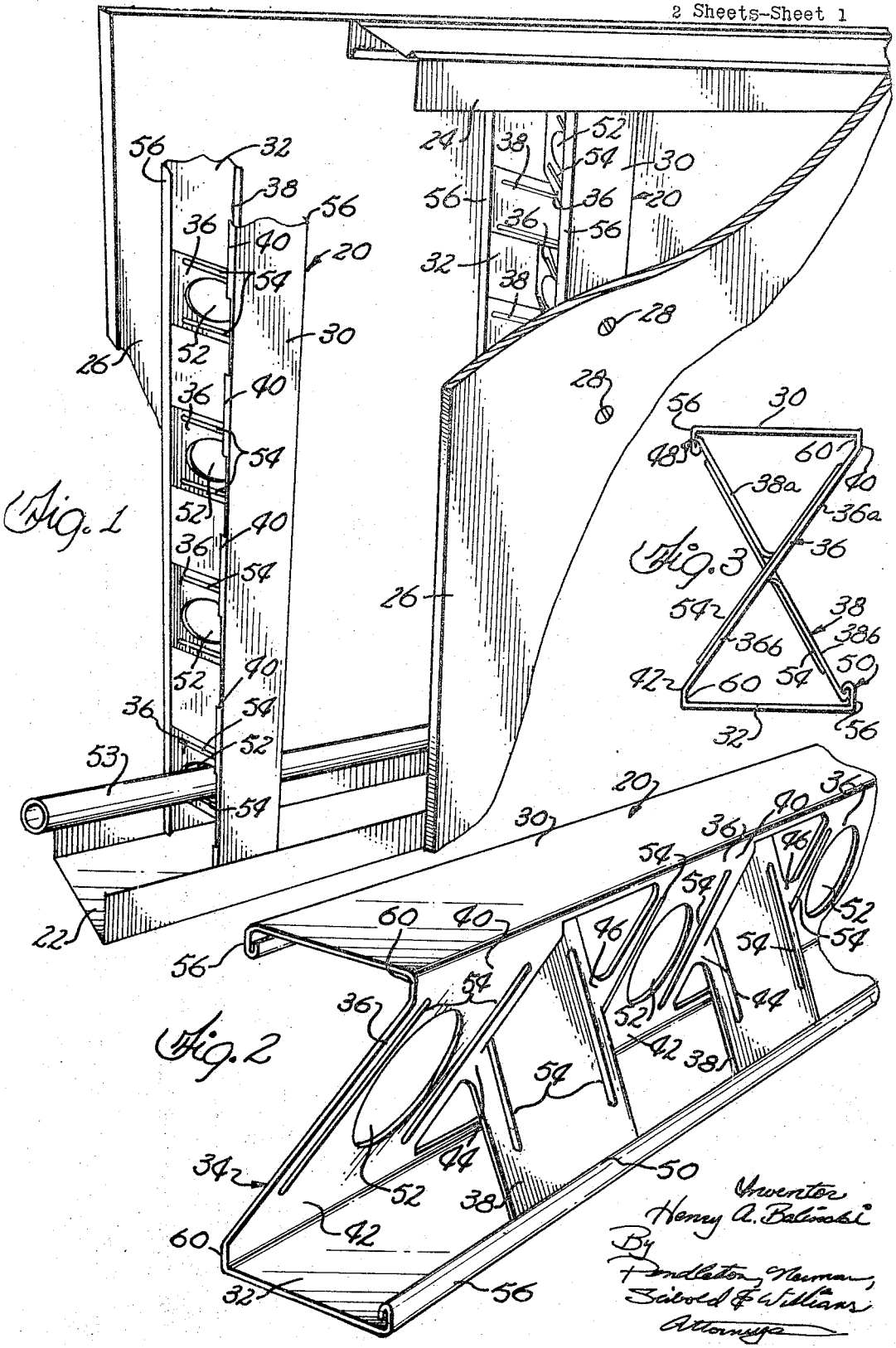

though flange portions of the studs, for instance as disclosed in Nelsson et al. United States Patent No. 3,056,234. One problem encountered in such constructions is that of preventing the stud flange from being deflected away from the panel under the applied force necessary to cause penetration of the flange by the fastener. For instance, with a channel-type sheet metal stud now in common use, the flange tends to bend inwardly away from the wallboard as the fasteners are driven into contact with the flange. The leading ends or penetrating tips of the fasteners then tend to travel laterally over the flange surface until sufficient pressure is exerted to cause the tips to penetrate the flange or the tips bypass the edge of the flange. This may even require the provision of some temporary lateral support for the flange while the fasteners are being started.

The lateral travel of the fastener tips requires additional effort on the part of the applying artisan to force the tips through the flange and secure the fasteners, and may result in the fasteners being positioned at an angle to the surface of the wallboard. One end effect is to disturb or mar the smooth surface of the wallboard, which is not conducive to providing a neat and clean surface for decoration as by painting or other finish application. To overcome these difficulties, it is desirable that a structural member be supplied for use as a stud or similar supporting member and which will insure maintenance of the fastener receiving flange in position during application of fasteners thereto. The member must also provide good load bearing strength and be resistant to bending and twisting. Further, such structural elements should be designed so that they can be economically produced, for instance, by utilizing a minimum amount of relatively lightweight sheet material and a minimum of manufacturing steps which should be simple and economical to perform.

Accordingly, it is an object of this invention to provide structural members meeting the aforenoted requirements.

It is an object of this invention to provide structural members which are resistant to twisting and bending, and it is a particular object of this invention to provide such structural members of light gauge sheet material.

It is a further object of this invention to provide structural members having flanges supported against deflection out of their normal plane, and it is a specific object of this invention to provide such structural members which may be fabricated from light gauge sheet material.

It is another object of this invention to provide structural members as set forth above and which may be economically produced.

It is a further object of this invention to provide a structural element of a new and novel cross-sectional shape and which is fabricated of sheet material.

It is another object of this invention to provide structural members as aforenoted, and which include provision for the passage of service elements such as pipes, conduits, and the like through a wall laterally of such members.

Further additional objects and advantages will become apparent to those skilled in the art from the description, accompanying drawings and appended claims.

In carrying out this invention in one illustrative form, an elongated structural member is fabricated from a unitary piece of sheet metal. This member includes a pair of flanges supported in spaced relation by a web extending longitudinally of the flanges. The web is generally of X configuration in cross section and includes two series of bracing elements formed from the web portion of the sheet metal blank. Each of the bracing elements in one series extends from the center of such X and is joined to one of the flanges, and each of the bracing elements in the other series extends from the center of the X and is joined to the other of the flanges, the two series of bracing elements thus forming the legs of the X. Successive elements in each of these series are joined to opposite edge portions of the respective flange. Alternate elements in each series are integral with the respective flange, and the other elements in such series are struck from the spaces between said alternate elements and are secured to the opposite edge portion of the respective flange as by welding, soldering, staking, forming an interlocked lip can seal, or the like.

For a more complete understanding of this invention reference should now be had to the examples illustrated in the drawings wherein:

FIG. 1 is a fragmentary perspective view of a wallboard panel construction including a stud employing teachings of this invention;

FIG. 2 is an enlarged perspective view of a portion of a stud according to FIG. 1;

FIG. 3 is an end elevation view of the stud in FIG. 2;

FIG. 4 is a plan view of a portion of a sheet metal blank cut to form a structural member such as the stud of FIG. 2;

FIGS. 5 and 6 are perspective views of portions of other embodiments of structural members employing teachings of this invention; and FIG. 7 is an end elevation view of the embodiment in FIG. 6.

Referring now to the drawings, and more particularly to FIG. 1, studs 20 are illustrated as being supported in a vertical position by floor and ceiling runners 22 and 24, with the runners being fastened to the floor and ceiling by suitable means, not illustrated. Wallboard panels 26 are positioned against both sides of the studs 22 and 24 and secured thereto by a plurality of fasteners 28, for instance rotary screw fasteners such as disclosed in United States Patent No. 3,056,234, which are driven through the boards and through the underlying flanges 30 and 32 of studs 20.

As best seen in FIGS. 2 and 3, each stud 20 comprises a pair of spaced, opposed, generally parallel elongated flanges 30 and 32 connected together by a web 34 extending longitudinally of the flanges. The web 34 comprises a plurality of bracing sections 36 and 38 arranged in alternating diagonal fashion as illustrated. Each section 36 is integral with one edge of flange 30 as at 40 and with the opposite edge of flange 32 as at 42. Bracing sections 38 are integral with the sections 36 approximately along the median or center line of the stud 20 as at 44 and 46 and have the opposite distal ends thereof secured to the opposite edges of flanges 30 and 32 as at 48 and 50 (see FIG. 3). The web 34 is fabricated with apertures 52 through sections 36 for passage of services such as pipes, conduits and the like as indicated at 53 in FIG. 1. Stiffening ribs 54 are formed in each section 36 and 38 to provide added rigidity, and to compensate for the loss of strength in providing apertures 52 in sections 36.

The formation of the bracing sections 36 and 38 is perhaps best illustrated by reference to the unitary blank 20a shown in FIG. 4. Elements 38a and 38b are cut or struck from the central or web portion 34a to define the sections 38 and thus to define corresponding elements 36a and 36b of sections 36 therebetween. The strikeouts for forming elements 38a and 38b terminate short of the respective flange portions 30a and 32a, though they may extend somewhat into the web portions as will be noted below with reference to FIGS. 5, 6 and 7. Each element 38a and 38b remains integral with the adjacent sections 36 through the integral connecting portions 44 and 46. The openings 52 may be cut or stamped in sections 36, and the ribs 54 may be formed by pressing or rolling grooves in one side of the blank 20a at the same time as elements 38a and 38b are formed.

To provide for forming a connection between the opposite free ends of sections 38 and the outer or distal edges of flanges 30 and 32, these outer edges are formed into upstanding edge flanges 56 each of which terminates in a J or hook-shaped section as illustrated. The distal end of each element 38a and 38b is formed with a complementary hook or J-shaped portion to cooperatively interengage the complementary terminal edges of flanges 56. These engaged portions may be tightly pressed together to provide a load transmitting joint between these portions of the structural element. The engaged portions of flange edges 56 and sections 38 may also be staked or otherwise secured to insure their being effectively locked together for load transmission purposes. Edge flanges 56 are of sufficient height to allow for the foreshortening of sections 38 occasioned by the formation of the hook sections at the ends thereof.

Edge flanges 56, together with generally parallel edge flanges 60 also add rigidity to the flanges 30 and 32.

It will be appreciated that the structural member of FIGS. 2 and 3 may be readily formed from a unitary blank of sheet metal by cutting and forming a blank as illustrated in FIG. 4. Thereafter the blank is bent along the indicated fold lines to form the longitudinal edge portions 30a and 32a into opposed positions as flanges 30 and 32. Sections 38 are rotated or bent out of the plane of sections 36 by bending or twisting sections 44 and 46, and interlocking portions at 48 and 50 are formed and bent into interlocking position and rolled, staked or otherwise secured in load-transmission engagement. These forming operations may be carried out by suitable hand or power operated machinery, and are well adapted for automatic equipment to rapidly, simply and economically provide a rigid structural element of lightweight sheet material such as sheet metal. For instance, a satisfactory stud 20 for use in a drywall construction as above described may be formed from a unitary blank of sheet steel of about 0.021 inch thickness.

The construction of the structural members 120 and 220 illustrated in FIGS. 5 and 6 respectively, are quite similar to the member 20 described above. Accordingly, similar numbers are applied to the corresponding parts of these embodiments but with the prefixes 1 and 2 according to the number assigned to the embodiment. The variations between these embodiments will be further described below.

Referring now to the modification illustrated in FIG. 5, a plurality of openings which may be circular or elliptical in plan are cut from the web portion 134 as at 135 to delineate sections 136 and 138. The sections 138 are so formed that the end portions thereof are struck from portions of the blank including edge portions of the flanges 130 and 132 as illustrated at 162 and 164. In this embodiment the sections 138 are joined to the outer edges of flanges 130 and 132 by forming a return bend along these outer edges as at 156 and forming the end portions 166 of sections 138 to lie parallel to flanges 130 and 132 when sections 138 are in their final position. Edges 166 are secured within the bends at 156 by suitable means such as by a rolling or crimping process, staking, welding, soldering or the like. The openings 135 provide passageways for pipes, conduits and the like extending transversely of the members 120.

The embodiment of FIGS. 6 and 7 differs somewhat from the previously described embodiments in that each bracing element 236 remains integral with flange 230 and the opposite end is affixed to the distal edge of flange 232. Similarly, sections 238 remain integral with flange 232 and the opposite ends thereof are affixed to the distal edge of flange 230. The joint between the distal ends of sections 236 and 238 and the distal edges of flanges 230 and 232 are illustrated as being similar to the joints shown and described with respect to FIG. 5, but may be effected by any other suitable means including those illustrated and described with respect to FIG. 2. Apertures may be provided for passage of services through member 220 as by providing openings 252 as illustrated, or by providing openings as illustrated in FIG. 5. Stiffening ribs 254 may also be provided in this embodiment. Member 220 provides an added advantage in manufacturing in that both mechanical joints between the sections 236 and 238 and the distal edges of the flanges 230 and 232 are formed along the same side of the structural member 220. This facilitates simultaneous formation of both joints in one pass of the member through appropriate joint forming apparatus.

It will be obvious that various other modifications of structural members may be made without departing from the spirit and scope of this invention. For instance, the securement of the severed ends of the bracing sections to the edge portions of the flanges may be effected by any suitable means, one convenient means additional to those illustrated being the provision of a simple overlap joint which may be spot welded.

It will thus be seen that a structural member has been provided with flanges which are supported by bracing sections to maintain the flanges in position as fasteners are driven therethrough. The diagonal bracing results in a member of novel cross-sectional design having good load-bearing strength and which is resistant to bending and twisting. Lateral openings are provided through the web for ready passage of service elements. Further, structural members according to this invention and achieving these results may be produced of relatively light gauge, formable sheet material and by relatively simple production operations which may be readily mechanized to provide an economical and desirable unit.

While particular embodiments of the invention have been shown, it will be understood, of course, that the invention is not limited thereto since many modifications may be made by those skilled in the art, particularly in light of the foregoing teachings. Therefore, it is contemplated by the appended claims to cover any such modifications as fall within the true spirit and scope of the invention.

I claim:

1. An elongated structural member comprising a pair of flanges, a web extending longitudinally of said flanges and supporting said flanges in parallel spaced relation, said web being of X configuration in cross section and including a first series and a second series of bracing elements joined in a continuous unit along the center portion of such X, said first series of bracing elements extending longitudinally of said flanges, each element in said first series extending from the center of such X to one of said flanges, successive elements of said first series being joined to opposite edge portions of said one of said flanges whereby said first series defines two legs of such X, said second series of bracing elements extending longitudinally of said flanges, each element in said second series extending from the center of such X to the other of said flanges, successive elements of said second series being joined to opposite edge portions of said other of said flanges whereby said second series defines the other two legs of such X, each of said elements in each of said series being joined to and lying in the same plane as an element in the other of said series.

2. An elongated structural member as in claim 1 wherein each two such joined elements define a straight section extending from one edge of one of said flanges to the diagonally opposite edge of the other of said flanges.

3. An elongated structural member as in claim 1 wherein each of said elements in each of said series is an integral extension of one of said elements lying in the same plane in the other of said series.

4. An elongated structural member as in claim 1 wherein each of said elements is formed with a reinforcing rib extending from the center of such X to the end of such element joined to the respective flange.

5. An elongated structural member formed of a unitary sheet of material and comprising a pair of flanges formed from spaced portions of such sheet and a web extending longitudinally of said flanges and formed from the portion of such sheet between such spaced portions, said web supporting said flanges in parallel spaced relation and being of X configuration in cross section, said web comprising a first series and a second series of bracing elements joined in a continuous unit along the center portion of such X, said first series of bracing elements extending longitudinally of said flanges, each element in said first series extending from the center of such X to one of said flanges, alternate elements in said first series being integral with one edge portion of said one of said flanges, the remaining elements of said first series being struck from between said alternate elements of said first series and joined to the opposite edge portion of said one flange whereby said first series defines two legs of such X, said second series of bracing elements extending longitudinally of said flanges, each element in said second series extending from the center of such X to the other of said flanges, alternate elements in said second series being integral with one edge portion of said other of said flanges, the remaining elements of said second series being struck from between said alternate elements of said second series and joined to the opposite edge portion of said other flange whereby said second series defines the other two legs of such X, each of said elements in each of said series being joined to and lying in the same plane as an element in the other of said series.

6. An elongated structural member as in claim 5 wherein each of said alternate elements in said first series is an integral extension of one of said alternate elements in said second series and comprises therewith a bracing section extending diagonally between said flanges in one plane, and each of said remaining elements in said first series is an integral extension of one of said remaining elements in said second series and comprises therewith a bracing section extending diagonally between said flanges in a second plane, whereby said bracing sections define such X in cross section.

7. An elongated structural member as in claim 5 wherein each of said alternate elements in said first series is an integral extension of one of said remaining elements in said second series and comprises therewith a bracing section extending diagonally between said flanges in one plane, and each of said alternate elements in said second series is an integral extension of one of said remaining elements in said first series and comprises therewith a bracing section extending diagonally between said flanges in a second plane, whereby said bracing sections define such X in cross section.

References Cited

UNITED STATES PATENTS

| | | | |
|---|---|---|---|
| 1,545,168 | 7/1925 | Schenck | 52—729 |
| 2,142,637 | 1/1939 | Faber | 52—636 X |
| 2,157,233 | 5/1939 | Geib | 52—732 |
| 2,508,032 | 5/1950 | Kennedy | 52—729 X |
| 2,685,354 | 8/1954 | Collins | 52—377 |
| 2,747,704 | 5/1956 | Gorey | 52—377 |
| 3,137,922 | 6/1964 | Schumacher | 29—155 |
| 3,158,925 | 12/1964 | Edge | 29—155 |
| 3,214,875 | 11/1965 | Slowinski | 52—729 X |

FOREIGN PATENTS 826,968   1/1952   Germany.

JOHN E. MURTAGH, *Primary Examiner.*

RICHARD W. COOKE, *Examiner.*

M. O. WARNECKE, L. R. RADONOVIC,
*Assistant Examiners.*